(12) United States Patent
Delmont et al.

(10) Patent No.: US 9,113,594 B1
(45) Date of Patent: Aug. 25, 2015

(54) REPLACEABLE BLADE ASSEMBLY

(71) Applicants: John Delmont, Columbus, KS (US); Ruth Delmont, Columbus, KS (US)

(72) Inventors: John Delmont, Columbus, KS (US); Ruth Delmont, Columbus, KS (US)

(*) Notice: Subject to any disclaimer, the term of this patent is extended or adjusted under 35 U.S.C. 154(b) by 165 days.

(21) Appl. No.: 13/692,267

(22) Filed: Dec. 3, 2012

(51) Int. Cl.
*A01D 34/73* (2006.01)

(52) U.S. Cl.
CPC .................................. *A01D 34/733* (2013.01)

(58) Field of Classification Search
USPC ............. 56/17.5, 255, 295, DIG. 19, DIG. 20
See application file for complete search history.

(56) References Cited

U.S. PATENT DOCUMENTS

| | | | | |
|---|---|---|---|---|
| 2,869,311 A | * | 1/1959 | Beeston, Jr. | 56/295 |
| 3,321,894 A | * | 5/1967 | Ingram | 56/295 |
| 3,665,692 A | * | 5/1972 | Hughes | 56/295 |
| 3,683,606 A | * | 8/1972 | Staines | 56/295 |
| 5,018,347 A | | 5/1991 | Feilen | |
| 5,019,113 A | | 5/1991 | Burnell | |
| 5,036,654 A | | 8/1991 | Malutich | |
| 5,383,329 A | | 1/1995 | Cornell, III et al. | |
| 6,182,430 B1 | | 2/2001 | Blarek et al. | |
| D450,066 S | | 11/2001 | Monesmith | |
| D482,700 S | | 11/2003 | Lancaster | |
| 6,935,095 B1 | | 8/2005 | Sluder | |
| 2003/0182918 A1 | * | 10/2003 | Stone et al. | 56/255 |
| 2009/0308045 A1 | * | 12/2009 | Bever | 56/295 |

\* cited by examiner

*Primary Examiner* — Thomas B Will
*Assistant Examiner* — Mai Nguyen

(57) ABSTRACT

A replaceable blade assembly includes an arm that may be coupled to a lawn mower. A blade is removably coupled to the arm so the blade may be moved by the arm. A clip is removably coupled to the arm so the clip may retain the blade on the arm.

7 Claims, 4 Drawing Sheets

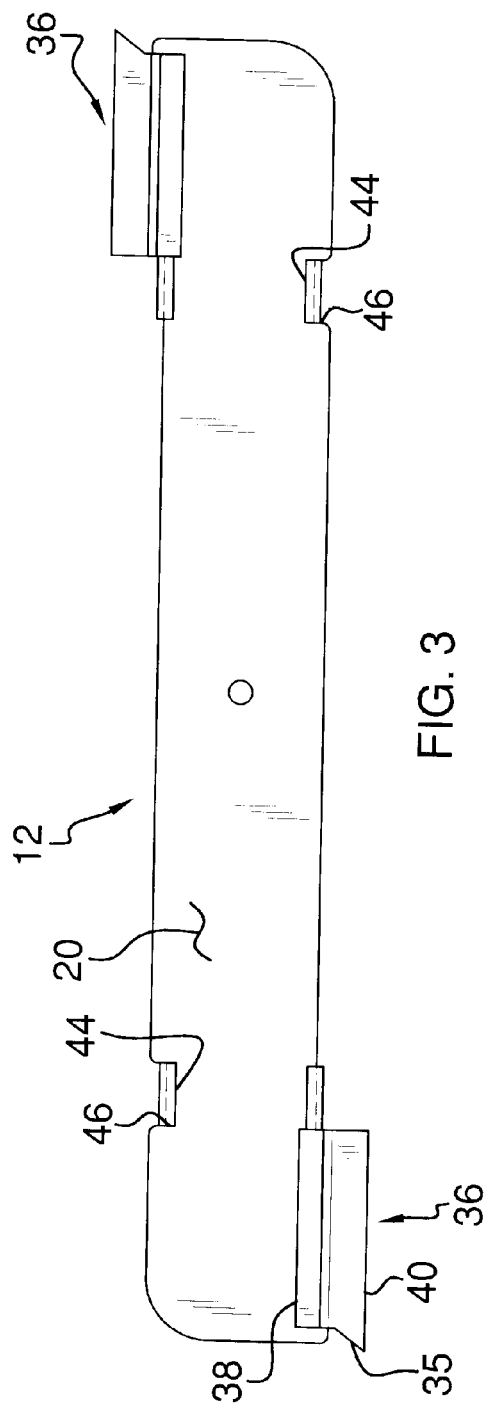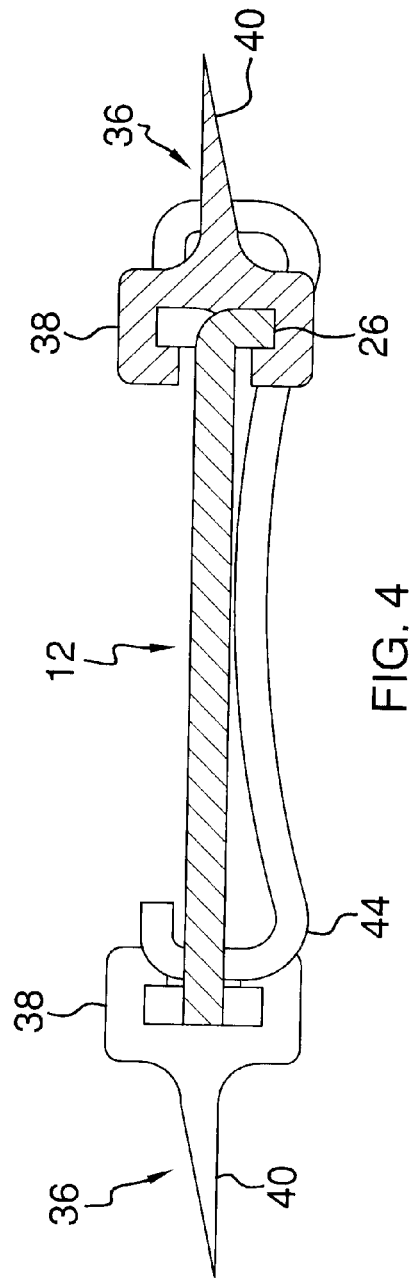

REPLACEABLE BLADE ASSEMBLY

BACKGROUND OF THE DISCLOSURE

Field of the Disclosure

The disclosure relates to replaceable blade devices and more particularly pertains to a new replaceable blade device for quickly replacing a cutting edge on a blade.

SUMMARY OF THE DISCLOSURE

An embodiment of the disclosure meets the needs presented above by generally comprising an arm that may be coupled to a lawn mower. A blade is removably coupled to the arm so the blade may be moved by the arm. A clip is removably coupled to the arm so the clip may retain the blade on the arm.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a bottom view of an embodiment of the disclosure.

FIG. 4 is a cross sectional view taken along line 4-4 of FIG. 2 of an embodiment of the disclosure.

DESCRIPTION OF THE PREFERRED EMBODIMENT

Figure 1:
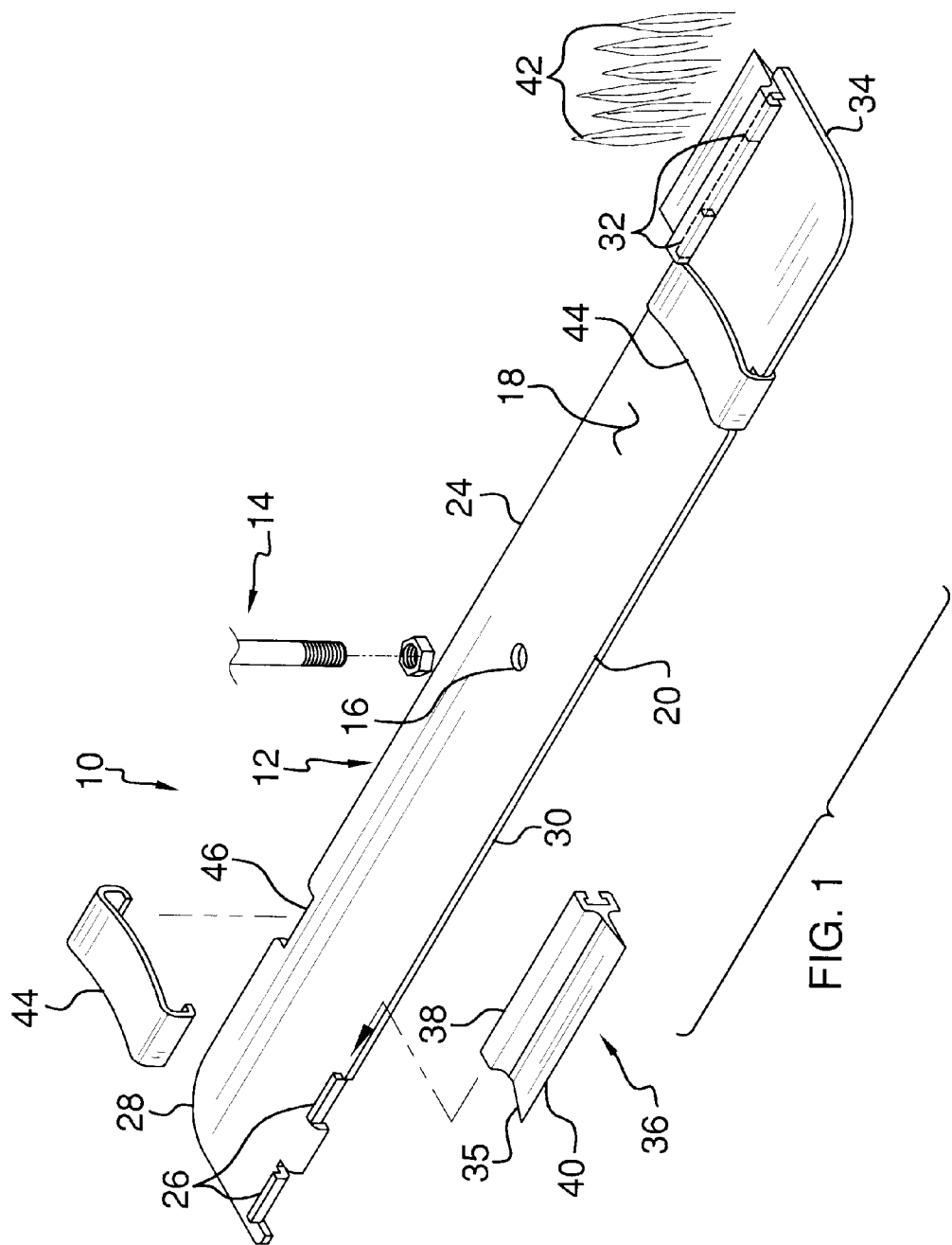
FIG. 1 is a perspective view of a replaceable blade assembly according to an embodiment of the disclosure.
Figure 2:
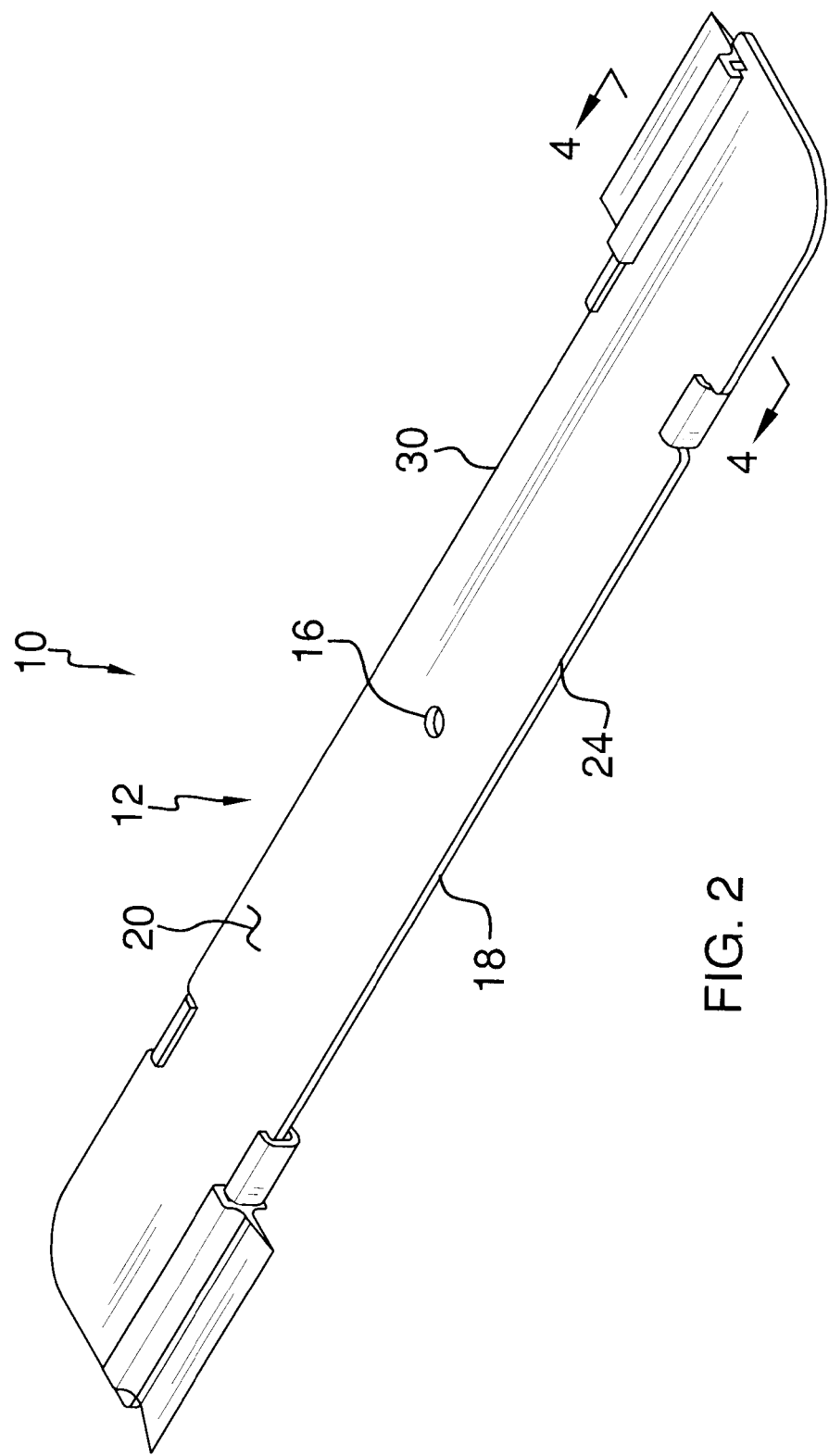
FIG. 2 is a bottom perspective view of an embodiment of the disclosure.
Figure 5:
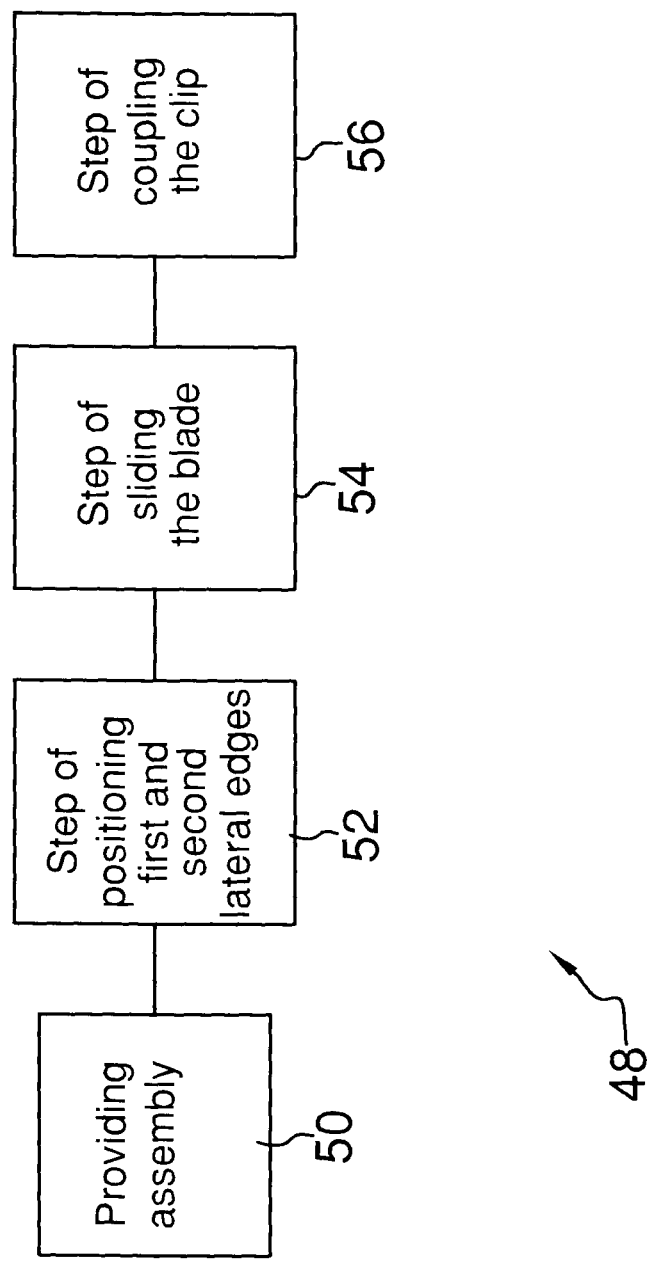
FIG. 5 is a schematic view of a method of utilizing an embodiment of the disclosure.

With reference now to the drawings, and in particular to FIGS. 1 through 5 thereof, a new replaceable blade device embodying the principles and concepts of an embodiment of the disclosure and generally designated by the reference numeral 10 will be described.

As best illustrated in FIGS. 1 through 5, the replaceable blade assembly 10 generally comprises an arm 12 that may be rotatably coupled to a lawn mower 14 of any conventional design. A centrally positioned shaft aperture 16 extends through a top surface 18 and a bottom surface 20 of the arm 12. The shaft aperture 16 may insertably receive a shaft 22 on the lawn mower 14 so the lawn mower 14 may rotate the arm 12. The arm 12 may have a length between 61 cm and 91 cm.

A first lateral edge 24 of the arm 12 is bent so a plurality of first tabs 26 is formed proximate a first end 28 of the arm 12. A second lateral edge 30 of the arm 12 is bent so a plurality of second tabs 32 is formed proximate a second end 34 of the arm 12. The plurality of the first 26 and second 32 tabs is spaced apart on the associated ones of the first 24 and second 30 lateral edges of the arm 12. Additionally, the plurality of first 26 and second 32 tabs alternately extends upwardly and downwardly from the associated one of the first 24 and second 30 lateral edges of the arm 12. The plurality of first 26 and second 32 tabs may each have a height between 6.5 mm and 12.5 mm.

A blade 36 comprises a coupling portion 38 that has a C-shape. The coupling portion 38 of the blade 36 may insertably receive the first 26 or second 32 tabs so the blade 36 is retained on the arm 12. A cutting portion 40 of the blade 36 is coupled to and extends forwardly from the coupling portion 38 of the blade 36 so the cutting portion 40 of the blade 36 may cut grass 42 when the blade 36 is moved by the arm 12. The blade 36 may have a length between 7.5 cm and 20 cm. The blade 36 is one of a pair of blades 36 that are each positionable proximate an associated one of the first end 28 and the second end 34 of the arm 12. A first end 35 of the cutting portion 40 of the blade 36 may be angled outwardly with respect to a first lateral side 37 of the blade 36.

A clip 44 has a C-shape so the clip 44 may engage the first lateral edge 24 and the second lateral edge 30 of the arm 12. The clip 44 is positionable on the top surface 18 of the arm 12 so the clip 44 is removably coupled to the arm 12. In addition, the clip 44 abuts the blade 36 when the clip 44 is removably coupled to the arm 12 so the clip 44 may retain the blade 36 on the arm 12. The clip 44 is one of a pair of clips 44 that are each positionable proximate an associated one of the pair of blades 36. Each of the pair of clips 44 may engage an associated one of a pair of clip grooves 46 each extending inwardly from an associated one of the first 24 and second 30 lateral edges of the arm 12.

In use, the assembly 10 allows for a method 48 of replacing a blade. The steps of the method 48 comprise a step 50 of providing the arm 12 comprising the first lateral edge 24, the second lateral edge 30, the first end 28 and the second end 34, the plurality of the first 26 and second 32 tabs coupled to the arm 12, the pair of blades 36 comprising the coupling 38 and the cutting 40 portions and the pair of clips 44. The method 48 also includes a step 52 of positioning a selected one of the first 24 or second 30 lateral edges of the arm 12 within the coupling portion of a selected one of the pair of blades 36. The method 48 further includes a step 54 of sliding the selected one of the blades 36 toward the associated one of the first 28 and second 34 ends of the arm 12 so the associated ones of the plurality of the first 26 and second 32 tabs is positioned within the coupling portion 38 of the blade 36. Finally, the method 48 includes a step 56 of coupling a selected one of the pair of clips 44 to the arm 12 proximate the selected one of the blades 36 so the clip 44 retains the selected one of the blades 36 on the arm 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A replaceable blade assembly comprising:

an arm configured to be coupled to a lawn mower, said arm having an aperture extending therethrough, said arm having a first end and a second end, said aperture being configured to receive a shaft of a lawn mower, said arm having a first lateral edge and a second lateral edge, said first lateral edge having a groove therein positioned between said first end and said aperture, said second lateral edge having a tab upwardly extending therefrom and being positioned nearer to said first end than said groove in said first lateral edge;

a blade removably coupled to said arm wherein said blade is moved by said arm, said blade being removably mounted on said tab, said blade extending laterally away from said second lateral edge of said arm;

a clip removably coupled to said arm wherein said clip retains said blade on said arm, said clip being positioned in said groove such that said clip is positioned between said aperture and said blade, said clip and said blade each being a unitary structure spaced from said aperture and removable from said arm; and a flange extending outwardly from said second lateral edge at a juncture of said second lateral edge and said first end, said blade being positioned between said flange and said clip.

2. The assembly according to claim 1, wherein said tab comprises a plurality of first tabs formed proximate a first end of said arm.

3. The assembly according to claim 2, further comprising:

said first lateral edge of said arm being bent wherein a plurality of second tabs is formed proximate said second end of said arm;

a second blade being mounted on said arm and positioned on said second tabs;

a second groove being positioned in said second lateral edge and positioned between said second tabs and said aperture;

a second clip being removably positioned in said second groove and releasably retaining said second blade on said arm; and a flange extending outwardly from said first lateral edge at a juncture of said first lateral edge and said second end, said blade being positioned between said flange and said second clip.

4. The assembly according to claim 3, further comprising said plurality of said first and second tabs being spaced apart on the associated ones of said first and second lateral edges of said arm wherein said plurality of first and second tabs alternately extends upwardly and downwardly from said associated one of said first and second lateral edges of said arm.

5. The assembly according to claim 1, further comprising a coupling portion of said blade having a C-shape wherein said coupling portion of said blade insertably receives a tab wherein said blade is retained on said arm.

6. The assembly according to claim 5, further comprising a cutting portion of said blade coupled to and extending forwardly from said coupling portion of said blade wherein said cutting portion of said blade is configured to cut grass.

7. The assembly according to claim 1, further comprising said clip having a C-shape wherein said clip engages a first lateral edge and a second lateral edge of said arm wherein said clip is removably coupled to said arm.

* * * * *